United States Patent
Bronold et al.

(10) Patent No.: US 6,756,147 B1
(45) Date of Patent: Jun. 29, 2004

(54) MEMBRANE ELECTRODE UNIT COMPRISING AN INTEGRATED SEALING EDGE

(75) Inventors: Matthias Bronold, Berlin (DE); Frank Mai, Ressen-Zaue (DE)

(73) Assignee: Heliocentris Energiesysteme GmbH, Berlin (DE)

(*) Notice: Subject to any disclaimer, the term of this patent is extended or adjusted under 35 U.S.C. 154(b) by 0 days.

(21) Appl. No.: 09/979,995
(22) PCT Filed: May 25, 2000
(86) PCT No.: PCT/DE00/01743

§ 371 (c)(1),
(2), (4) Date: Mar. 14, 2002

(87) PCT Pub. No.: WO00/74161

PCT Pub. Date: Jul. 12, 2000

(30) Foreign Application Priority Data

May 28, 1999 (DE) .......................... 199 26 027

(51) Int. Cl.[7] .......................... H01M 2/08; B32B 23/02; B05D 5/12
(52) U.S. Cl. .......................... 429/35; 429/36; 429/30; 428/192; 428/200; 427/115
(58) Field of Search .......................... 429/30, 34, 35, 429/40, 36; 428/192, 200, 346, 327, 355 H; 427/115

(56) References Cited

U.S. PATENT DOCUMENTS 5,187,025 A   2/1993   Kelland et al. ............... 429/33
5,912,088 A * 6/1999   Ernst ............................ 429/35
6,007,933 A * 12/1999  Jones ........................... 429/38

FOREIGN PATENT DOCUMENTS

| DE | 19703214 | 11/1998 |
| GB | 2323700  | 9/1998  |
| JP | 08148169 | 10/1996 |
| JP | 09289028 | 2/1998  |
| WO | 9222096  | 12/1992 |

* cited by examiner

Primary Examiner—Patrick Ryan
Assistant Examiner—Raymond Alejandro
(74) Attorney, Agent, or Firm—Webb Ziesenheim Logsdon Orkin & Hanson, P.C.

(57) ABSTRACT

The invention relates to a membrane electrode unit which is provided for a fuel cell or the like and which comprises a polymer electrolyte membrane that is coated on both sides with electrodes. The sealing edge which is configured on the outer periphery is comprised of a hot-melt-type adhesive whose hydrocarbon skeleton carries, at regular intervals, ionic or strong polar groups which enter into a surface interaction with the ionic groups of the membrane material and thus provide for a good adhesive effect of the hot-melt-type adhesive to the polymer electrolyte membrane. A portion of the sealing edge that protrudes over the outer edge of the membrane electrode unit forms a one-piece homogeneous edge area which is provided with openings for installation and for guiding media, which further improves the sealing effect of the membrane electrode unit, and which contributes to the stability thereof.

11 Claims, 2 Drawing Sheets

MEMBRANE ELECTRODE UNIT COMPRISING AN INTEGRATED SEALING EDGE

BACKGROUND OF THE INVENTION

1. Field of the Invention

This invention relates to a membrane electrode unit with an integrated sealing edge for electrochemical cells which consists of a polymer electrolyte membrane and electrodes that cover it on both sides as well as thermoplastic sealing means deposited on the peripheral edge.

2. Description of the Prior Art

DE 197 03 214 describes a membrane electrode unit of the type described above, in which the sealing edge penetrates the electrodes in the peripheral area in question and adheres to the polymer electrolyte membrane. The sealing material used is a thermoplastic or thermosetting plastic which is formulated so that in the liquid phase it travels by capillary action through the pores into the electrodes to the polymer electrolyte membrane and adheres to it, thereby creating a secure seal. It has been found, however, that the ion-conducting polymer electrolyte membranes of the prior art which have ionic groups suspended on the polymer skeleton have a very low surface energy. Therefore they are very difficult to bond to other materials, which means that the adhesive and sealing action is limited.

The object of the invention is therefore to realize the sealing edge for a membrane electrode unit so that an effective sealing action is achieved on the polymer electrolyte membrane and at the openings to guide the media, and simultaneously to facilitate the handling of the membrane electrode unit during installation.

BRIEF SUMMARY OF THE INVENTION

The invention teaches that this object can be accomplished with a membrane electrode unit of the type described in the introduction to claim 1, whereby the sealing edge consists of a layer of hot-melt-type adhesive that is deposited on both sides, and extends beyond the outer edge of the membrane electrode unit where it forms a one-piece projecting partial area, whereby the hot-melt-type adhesive contains ionic or strong polar groups for the generation of a surface interaction with the ionic groups of the polymer electrolyte membrane and thus a good adhesive action.

The invention thereby makes available a membrane electrode unit with a relatively stable sealing edge that adheres well to the membrane material and which, on account of its reinforcing action, also guarantees easy handling during installation and additionally makes possible a simple and effectively sealed realization of the openings for installation and to guide media In a fuel cell stack. Because the sealing edge is attached only to the outer peripheral area of the membrane electrode unit, the amount of membrane and electrode material required is relatively small. The good adherence and seal is achieved on one hand because the area that projects outward forms a one-piece unit, and on the other hand because the polar groups that are present at essentially regular intervals on the hydrocarbon skeleton of the hot-melt-type adhesive enter into a strong polar interaction with the membrane material which contains acid groups and thus produce a strong adhesive effect.

Additional features and advantageous developments and advantages of the invention are described in the dependent claims and in the following description of one embodiment of the invention which is presented purely by way of example.

BRIEF DESCRIPTION OF THE DRAWINGS

The exemplary embodiment is explained in greater detail below with reference to the accompanying illustrations, in which.

DETAILED DESCRIPTION OF THE PREFERRED EMBODIMENTS

Figure 1:
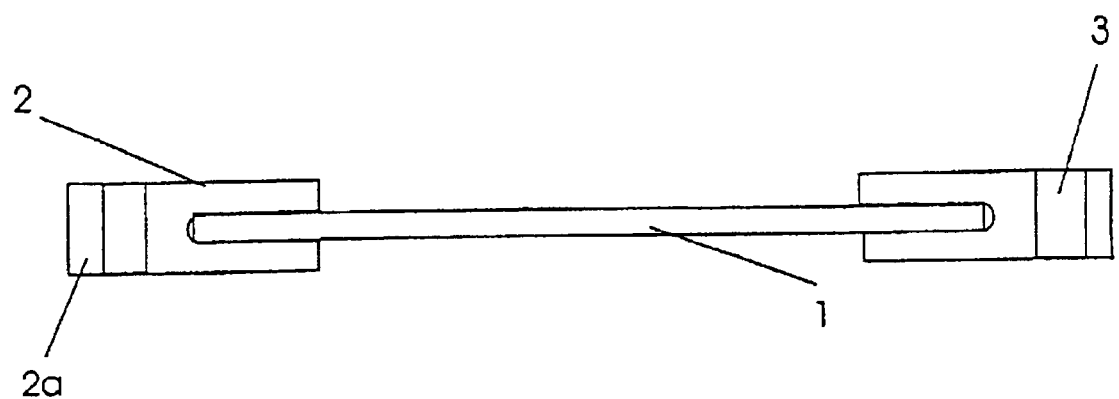
FIG. 1 is a sectional view of a membrane electrode unit provided with a sealing edge realized as taught by the invention.
Figure 2:
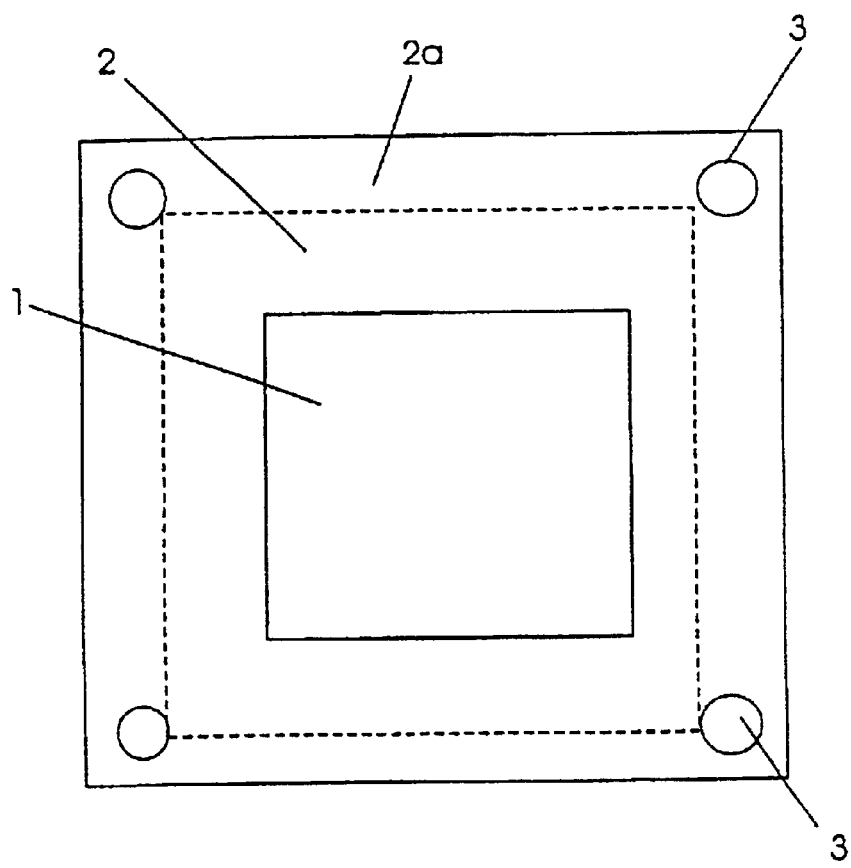
FIG. 2 is a plan view of the membrane electrode unit illustrated in FIG. 1.
Figure 3:
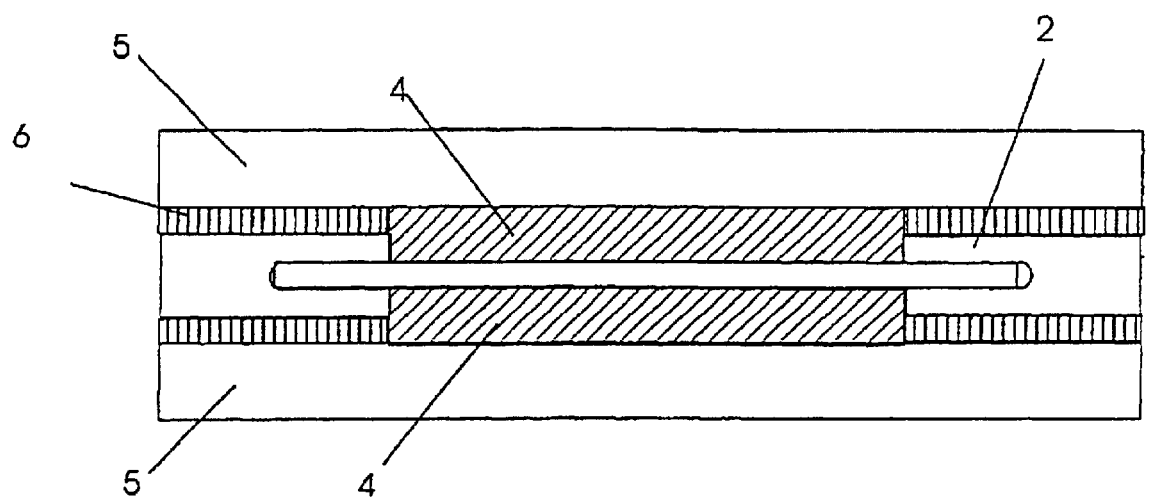
FIG. 3 is a sectional view of a membrane electrode unit supplemented with gas distributors and current leads located on both sides in a fuel cell.

As shown in FIGS. 1 to 3, the membrane electrode unit 1 is provided on the periphery with a special hot-melt-type adhesive for the realization of an installation edge or a sealing edge 2 with a sealing action in a fuel cell or a fuel cell stack. The sealing edge covers the peripheral area of the membrane electrode unit 1 on both sides and extends beyond its encircling edge into a one-piece peripheral area 2a, in which there are openings 3 to guide media and/or for the installation of the unit in a fuel cell stack. The sealing edge is realized under the action of heat and pressure applied to the hot-melt-type adhesive material which is in turn applied to the edge of the membrane electrode unit 1, whereby the hot-melt-type adhesive material, while it is in the molten phase, is permanently connected in the projecting area with the hot-melt-adhesive material on the other side and also with the membrane electrode unit 1.

The result is a membrane electrode unit which has a relatively rigid edge with a sealing action. The membrane electrode unit 1 is thereby easy to handle and to install. The amount of membrane and electrode material required is small, because the hot-melt-type adhesive covers only the extreme outer edge of the membrane electrode unit and the unit becomes easy to handle and install because the hot-melt-type adhesive extends beyond the outer edge of the membrane and electrode material.

An important requirement for the connection of the sealing edge 2 with the membrane electrode unit 1 is the availability of a suitable hot-melt-type adhesive, because good adherence is normally difficult to achieve on account of the low surface energy of the polymer electrolyte membrane. The invention therefore teaches the use of a hot-melt-type adhesive with ionic or strong polar groups which guarantee good adherence by their interaction with the ionic groups of the membrane material. In the exemplary embodiment described and illustrated, the hot-melt-type adhesive used is a copolymer of ethylene and methacrylic acid, which bonds extremely well with the polymer electrolyte membrane on account of the carboxylic acid groups.

FIG. 3 shows a complete fuel cell unit using a membrane unit 1 that has been provided with the sealing edge 2. Located on both sides of the membrane electrode unit 1 are gas distributors 4 made of porous carbon and current leads 5 (or bipolar plates). In this case there is an additional seal 6 in the space left between the current leads 5 and the sealing edge 2.

What is claimed is:

1. A membrane electrode unit with integrated sealing edge for electrochemical cells, comprising a polymer electrolyte membrane and electrodes coating said membrane on both sides as well as a thermoplastic sealing edge applied to the peripheral edge, wherein the sealing edge includes a hot-melt-type adhesive layer applied to both sides which extends beyond the outer edge of the membrane electrode unit where it forms a one-piece projecting partial area, whereby the hot-melt-type adhesive contains ionic or strong polar groups to generate a surface interaction with the ionic groups of the polymer electrolyte membrane and thus a good adhesive action.

2. The membrane electrode unit as claimed in claim 1, wherein the projecting partial area of the sealing edge openings are provided for installation and/or for media guidance in a fuel cell stack.

3. The membrane electrode unit as claimed in claim 1, wherein for the formation of a complete cell, the active area of the membrane electrode unit is covered on both sides with a gas distributor and bipolar plates or current leads are laid, one on each side, over the entire unit, whereby the bipolar plate or the current lead is attached by adhesive at least on one side directly to the sealing edge.

4. The membrane electrode unit as claimed in claim 3, further including an additional seal provided between the sealing edge and the current lead.

5. The membrane electrode unit as claimed in claim 1, wherein the hot-melt-type adhesive is a copolymer formed from a monomer and carboxylic acid or salts its polar derivatives.

6. The membrane electrode unit as claimed in claim 5, wherein the hot-melt-type adhesive for the sealing edge is a copolymer of ethylene and methacrylic acid.

7. The membrane electrode unit as claimed in claim 5, wherein the hot-melt-type adhesive for the sealing edge is a copolymer of ethylene and vinyl acetate.

8. The membrane electrode unit as claimed in claim 1, wherein the hot-melt-type adhesive contains carboxylic acid ester bonds at essentially regular intervals in a polymer skeleton.

9. The membrane electrode unit as claimed in claim 6, wherein the hot-melt-type adhesive is copolymerized with additional components such as organic acids or other polar acid derivatives, such as acid anhydrides or esters, for example.

10. The membrane electrode unit as claimed in claim 7, wherein the hot-melt-type adhesive is copolymerized with additional components such as organic acids or other polar acid derivatives, such as acid anhydrides or esters, for example.

11. The membrane electrode unit as claimed in claim 8, wherein the hot-melt-type adhesive is copolymerized with additional components such as organic acids or other polar acid derivatives, such as acid anhydrides or esters, for example.

* * * * *

UNITED STATES PATENT AND TRADEMARK OFFICE
CERTIFICATE OF CORRECTION

PATENT NO. : 6,756,147 B1
DATED : June 29, 2004
INVENTOR(S) : Bronold et al.

It is certified that error appears in the above-identified patent and that said Letters Patent is hereby corrected as shown below:

Column 3,
Lines 25-26, "or salts its polar derivatives" should read -- of its salts or its polar derivatives --

Signed and Sealed this

Eleventh Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,756,147 B1
DATED : June 29, 2004
INVENTOR(S) : Bronold et al.

It is certified that error appears in the above-identified patent and that said Letters Patent is hereby corrected as shown below:

<u>Column 3,</u>
Lines 25-26, "or salts its polar derivatives" should read -- or its salts or its polar derivatives --

This certificate supersedes Certificate of Correction issued January 11, 2005.

Signed and Sealed this

Nineteenth Day of April, 2005

JON W. DUDAS
*Director of the United States Patent and Trademark Office*